(12) United States Patent
Chen

(10) Patent No.: US 11,988,268 B2
(45) Date of Patent: May 21, 2024

(54) INTEGRATED POWER DISTRIBUTION APPARATUS FOR COOKING ROBOT

(71) Applicant: SHENZHEN XIANYU POWER TECHNOLOGY CO., LTD., Shenzhen (CN)

(72) Inventor: Xu Chen, Shenzhen (CN)

(73) Assignee: SHENZHEN XIANYU POWER TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/266,757

(22) PCT Filed: Jan. 25, 2022

(86) PCT No.: PCT/CN2022/073662
§ 371 (c)(1),
(2) Date: Jun. 12, 2023

(87) PCT Pub. No.: WO2022/127939
PCT Pub. Date: Jun. 23, 2022

(65) Prior Publication Data
US 2024/0035549 A1 Feb. 1, 2024

(30) Foreign Application Priority Data
Dec. 16, 2020 (CN) .......................... 202011485346.7

(51) Int. Cl.
*F16H 1/22* (2006.01)
*B25J 9/10* (2006.01)
(Continued)

(52) U.S. Cl.
CPC ................ *F16H 1/22* (2013.01); *B25J 9/102* (2013.01); *B25J 11/0045* (2013.01);
(Continued)

(58) Field of Classification Search
CPC ......... B25J 9/102; B25J 11/0045; F16H 1/22; F16H 3/089; F16H 37/16; F16H 57/021;
(Continued)

(56) References Cited

U.S. PATENT DOCUMENTS 5,910,067 A * 6/1999 Vandendriessche .. B60W 10/18
477/92
2008/0197733 A1 8/2008 Oberle
(Continued)

FOREIGN PATENT DOCUMENTS

CN 201621254 11/2010
CN 102918970 11/2012
(Continued)

OTHER PUBLICATIONS

CN 111336222 A (Zuo-Zhao Lei)Jun. 26, 2020 (full text). [online] [retrieved on Dec. 5, 2023]. Retrieved from: Clarivate Analytics. (Year: 2020).*

(Continued)

*Primary Examiner* — Joseph Brown
(74) *Attorney, Agent, or Firm* — Farjami & Farjami LLP

(57) ABSTRACT

An integrated power distribution apparatus for a cooking robot, including: a bottom plate (1); a motor fixing base (2) fixedly mounted on one side of a surface of the bottom plate, a power motor (3) fixedly mounted on one side of the motor fixing base, a control motor (4) fixedly mounted on a surface of the motor fixing base, two shaft couplers (5) respectively arranged on one sides of the power motor and the control motor, a fixed support (6) fixedly mounted on the surface of the bottom plate, two rotation output shafts (7) respectively arranged on a surface of the fixed support, four power output gears (8) sequentially arranged from left to right on one side of the rotation output shaft, a placement base (22) fixedly mounted on the surface of the bottom plate, and bearings (Continued)

(23) respectively arranged on two sides of an interior of the placement base.

8 Claims, 7 Drawing Sheets

(51) Int. Cl.
    *B25J 11/00* (2006.01)
    *F16H 37/16* (2006.01)
    *F16H 57/021* (2012.01)
    *F16H 57/023* (2012.01)
    *F16H 57/031* (2012.01)
    *H02K 5/00* (2006.01)
    *H02K 7/08* (2006.01)
    *H02K 7/116* (2006.01)
    *F16H 57/02* (2012.01)

(52) U.S. Cl.
    CPC ........... *F16H 37/16* (2013.01); *F16H 57/021* (2013.01); *F16H 57/023* (2013.01); *F16H 57/031* (2013.01); *H02K 5/00* (2013.01); *H02K 7/08* (2013.01); *H02K 7/116* (2013.01); *F16H 2057/02034* (2013.01); *F16H 2057/02073* (2013.01)

(58) Field of Classification Search
    CPC ................. F16H 57/023; F16H 57/031; F16H 2057/02034; F16H 2057/02073; F16H 2200/0043; H02K 7/08; H02K 7/116; B60K 1/02; B60K 17/08; B60K 17/12
    See application file for complete search history.

(56) References Cited

U.S. PATENT DOCUMENTS

| | | | |
|---|---|---|---|
| 2017/0009870 A1 | 1/2017 | Hoffman | |
| 2018/0372208 A1 | 12/2018 | Barton | |
| 2020/0278020 A1* | 9/2020 | Inoue | F16H 57/021 |

FOREIGN PATENT DOCUMENTS

| | | | | |
|---|---|---|---|---|
| CN | 202531799 | | 11/2012 | |
| CN | 203166687 | | 8/2013 | |
| CN | 203225626 | | 10/2013 | |
| CN | 106003072 | | 10/2016 | |
| CN | 106090131 | | 11/2016 | |
| CN | 107041699 | | 8/2017 | |
| CN | 206592519 | | 10/2017 | |
| CN | 107366732 | | 11/2017 | |
| CN | 206874756 | | 1/2018 | |
| CN | 107834768 | | 3/2018 | |
| CN | 207330220 | | 5/2018 | |
| CN | 108843776 | | 11/2018 | |
| CN | 108968671 | | 12/2018 | |
| CN | 109013829 | | 12/2018 | |
| CN | 208845648 | | 5/2019 | |
| CN | 110296194 A | * | 10/2019 | ........... F16H 37/042 |
| CN | 209925526 | | 1/2020 | |
| CN | 210408124 | | 4/2020 | |
| CN | 111089144 A | * | 5/2020 | ............... F16H 3/20 |
| CN | 111306765 | | 6/2020 | |
| CN | 111336222 A | * | 6/2020 | |
| CN | 211380984 | | 9/2020 | |
| CN | 211508832 | | 9/2020 | |
| CN | 211720425 | | 10/2020 | |
| CN | 112594333 | | 4/2021 | |
| JP | 2016-41970 A | | 8/2014 | |

OTHER PUBLICATIONS

International Search Report dated Apr. 14, 2022 for PCT/CN2022/073662.
Written Opinion dated Apr. 14, 2022 for PCT/CN2022/073662.
First Search dated Oct. 2, 2021 for CN Application 2020114853467.
Supplementary Search dated Dec. 7, 2021 for CN Application 2020114853467.
Fan Hua etc. "Study on Powder Condiment Adding System for Cooking Robot" Chinese Excellent Doctoral and Master's Dissertation Full-Text Data Base (Master) vol. 4 Jan. 1, 2016.

* cited by examiner

INTEGRATED POWER DISTRIBUTION APPARATUS FOR COOKING ROBOT

CROSS-REFERENCE TO RELATED APPLICATIONS

This application is a national stage filing under 35 U.S.C. § 371 of international application number PCT/CN2022/073662, filed Jan. 25, 2022, which claims priority to Chinese patent application No. 2020114853467 filed Dec. 16, 2020. The contents of these applications are incorporated herein by reference in their entirety.

TECHNICAL FIELD

The disclosure relates to the field of cooking, and more particularly, to an integrated power distribution apparatus for a cooking robot.

BACKGROUND

Modern kitchen appliances, such as mixers, stand mixers, dishwashers, water purifiers, range hoods, coffee makers and ovens, all need to be driven by a motor. These split devices usually need to be equipped with a motor and a motor drive circuit system for driving the motor respectively. Therefore, not only the cost of kitchen appliances is increased, but also a larger kitchen space is occupied.

The existing integrated power distribution apparatus for a cooking robot needs to be assembled and operated by multiple devices, but the existing integrated power distribution apparatus for a cooking robot has a large volume and occupies a large space, is complicated in structure and difficult to maintain, and has high setting and use costs.

Therefore, it is necessary to provide an integrated power distribution apparatus for a cooking robot to solve the above technical problems.

SUMMARY

The disclosure provides an integrated power distribution apparatus for a cooking robot, and solves the problems that the existing integrated power distribution apparatus for a cooking robot has a large volume and occupies a large space, is complicated in structure and difficult to maintain, and has high setting and use costs.

In order to solve the above technical problems, an integrated power distribution apparatus for a cooking robot provided by the disclosure comprises:

a bottom plate;
a motor fixing base, wherein the motor fixing base is fixedly mounted on one side of a surface of the bottom plate;
a power motor, wherein the power motor is fixedly mounted on one side of the motor fixing base and located above the bottom plate;
a control motor, wherein the control motor is fixedly mounted on a surface of the motor fixing base and located on one side of the motor fixing base on which the power motor is located;
a shaft coupler, wherein two shaft couplers are provided, and the two shaft couplers are respectively arranged on one sides of the power motor and the control motor and located on the surface of the motor fixing base;
a fixed support, wherein the fixed support is fixedly mounted on the surface of the bottom plate and located on one sides of the two shaft couplers;
a rotation output shaft, wherein two rotation output shafts are provided, and the two rotation output shafts are respectively arranged on a surface of the fixed support and located on one side of the fixed support opposite to the two shaft couplers;
a power output gear, wherein four power output gears are provided, and the four power output gears are sequentially arranged from left to right on one side of the rotation output shaft;
a placement base, wherein the placement base is fixedly mounted on the surface of the bottom plate and located on one side of the power output gears; and
a bearing, wherein two bearings are provided, and the two bearings are respectively arranged on two sides of an interior of the placement base.

Preferably, one side of the fixed support is fixedly connected with a fixed shaft, a synchronous wheel fork is sleeved on both sides of a surface of the fixed shaft, and power synchronous wheels are arranged inside the two synchronous wheel forks and located on two sides of the power output gears.

Preferably, one end of the rotation output shaft is fixedly connected with a roller selector, both sides of a surface of the roller selector are provided with a groove, the two grooves are internally provided with an offset point, and cylindrical blocks are arranged in the two grooves and located on one side of the roller selector.

Preferably, the bottom plate is provided with a cavity at one side of the bottom plate, in which a driving apparatus is arranged, the driving apparatus comprises a rotating rod, a top end of the rotating rod is fixedly connected with a threaded rod, a surface of the threaded rod is threadedly connected with a threaded block, a sliding rod is fixedly connected on a surface of the bottom plate and located on one side opposite to the threaded rod, a sliding block is sleeved around the sliding rod, one sides of the threaded block and the sliding block opposite to each other are both provided with a rotating base, and a protective cover is arranged between the two rotating bases.

Preferably, a first pulley is sleeved around the rotating rod, a motor is fixedly mounted on the surface of the bottom plate and located on one side of the threaded rod, one end of an output shaft of the motor is fixedly connected with a second pulley through a shaft coupler, and the first pulley and the second pulley are in transmission connection through a belt.

Preferably, retracting apparatuses are arranged in the cavity and located on two sides of the rotating rod, the retracting apparatus comprises a first gear, both sides of the first gear are engaged with a second gear, bottom portions of the two second gears are both fixedly connected with a rotary rod, and bottom portions of the two rotary rods are rotatably connected with two sides of a bottom portion of an inner wall of the cavity through a rotating shaft.

Preferably, rotating wheels are sleeved around the two rotary rods, both sides of a top portion of the inner wall of the cavity are fixedly provided with a fixed pulley, and both sides of a bottom portion of the protective cover are fixedly connected with the two rotating wheels through a connecting rope.

The use of the fixed pulley can reduce friction generated during the use of the connecting rope, and can prolong a service life of the connecting rope.

Preferably, a movable assembly is provided in the protective cover, the movable assembly comprises an arc-shaped cavity, an arc-shaped movable plate is provided in the arc-shaped cavity, one side of the arc-shaped movable plate is fixedly connected with a limit plate, and a grip is fixedly mounted on one side of a surface of the arc-shaped movable plate.

Preferably, a baffle assembly is arranged in the protective cover and located below the arc-shaped cavity, the baffle assembly comprises a placement cavity, and a revolving rod is rotatably connected between two sides of an inner wall of the placement cavity through a rotating shaft.

Preferably, one side of a surface of the revolving rod is provided with a coil spring, both sides of the surface of the revolving rod are fixedly connected with a baffle plate, and the surface of the revolving rod is provided with a baffle fabric.

The use of the baffle plate can prevent the baffle fabric from deviating when the baffle fabric is rolled and used.

Compared with the related art, the integrated power distribution apparatus for a cooking robot provided by the disclosure has the following beneficial effects.

According to the integrated power distribution apparatus for a cooking robot provided by the disclosure, one power motor, one control motor and one set of mechanical transmission structure are used, forming one integrated power distribution apparatus. The integrated power distribution apparatus can be applied to the cooking robot, which has a reliable structure and a smaller occupied space, and the cost of kitchen equipment can be reduced due to reduction in amount of the equipment.

According to the integrated power distribution apparatus for a cooking robot provided by the disclosure, the driving apparatus and the protective cover are cooperated to facilitate the protection of the apparatus, which can prevent an operator from suffering a physical injury in the case of improper operation, and can reduce a probability of machining accidents, the sliding rod and the sliding block are cooperated to limit the protective cover, which can prevent the protective cover from rotating during working of the threaded block, the retracting apparatus is used to conveniently drive the protective cover to move in cooperation with the driving apparatus, which can facilitate the maintenance by the operator, and the movable assembly and the baffle assembly are cooperated to facilitate the observation of the apparatus by the operator, and facilitate the protection of the operator.

Figure 1:
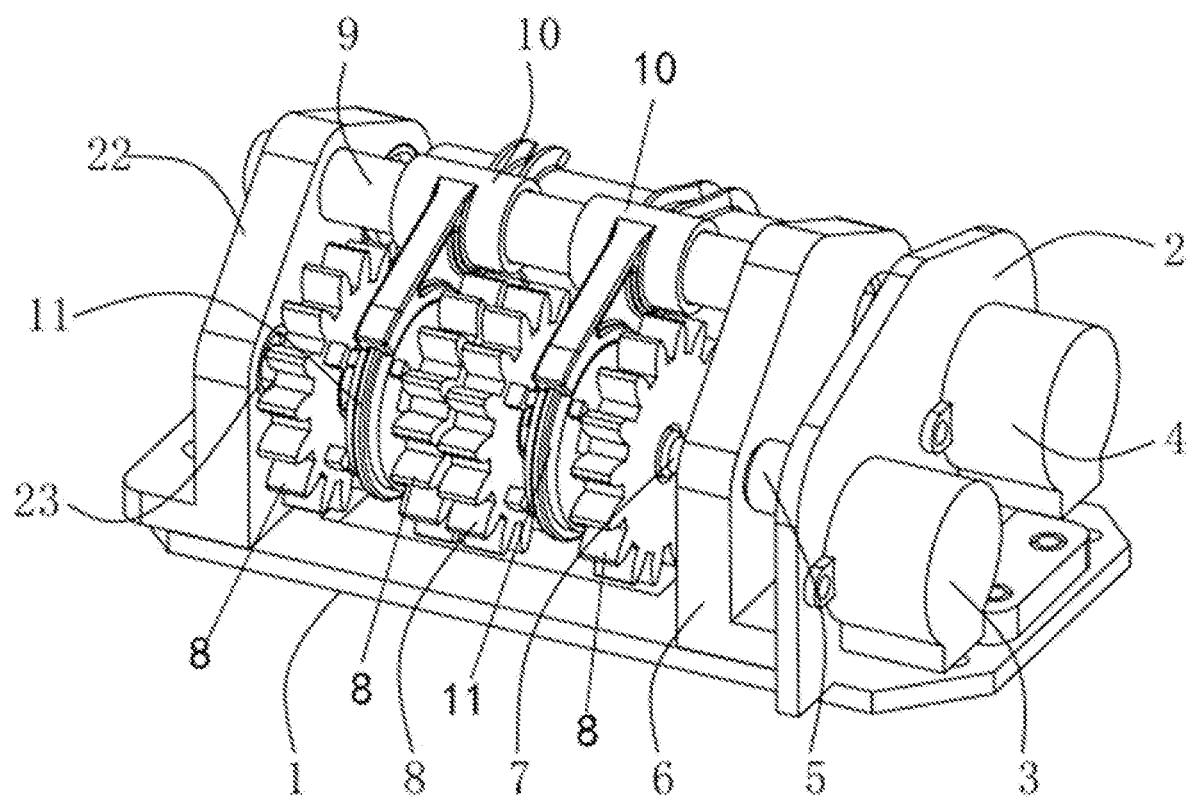
FIG. 1 is a schematic structural diagram of First Embodiment of an integrated power distribution apparatus for a cooking robot provided by the disclosure.

REFERENCE NUMERALS IN THE DRAWINGS 1 refers to bottom plate, 2 refers to motor fixing base, 3 refers to power motor, 4 refers to control motor, 5 refers to shaft coupler, 6 refers to fixed support, 7 refers to rotating output shaft, 8 refers to power output gear, 9 refers to fixed shaft, 10 refers to synchronous wheel fork, 11 refers to power synchronous wheel, 12 refers to groove, 13 refers to offset point, 14 refers to cylindrical block, 15 refers to cavity, 16 refers to driving apparatus, 161 refers to rotating rod, 162 refers to threaded rod, 163 refers to threaded block, 164 refers to first pulley, 165 refers to motor, 166 refers to second pulley, 17 refers to retracting apparatus, 171 refers to first gear, 172 refers to second gear, 173 refers to rotary rod, 174 refers to rotating wheel, 175 refers to fixed pulley, 176 refers to connecting rope, 18 refers to movable assembly, 181 refers to arc-shaped cavity, 182 refers to arc-shaped movable plate, 183 refers to limit plate, 184 refers to grip, 19 refers to baffle assembly, 191 refers to placement cavity, 192 refers to revolving rod, 193 refers to coil spring, 194 refers to baffle plate, 195 refers to baffle fabric, 20 refers to rotating base, 21 refers to protective cover, 22 refers to placement base, 23 refers to bearing, 24 refers to roller selector, 25 refers to sliding block, and 26 refers to sliding rod.

DETAILED DESCRIPTION

The disclosure is further described hereinafter with reference to the drawings and the specific embodiments.

First Embodiment

Figure 2:
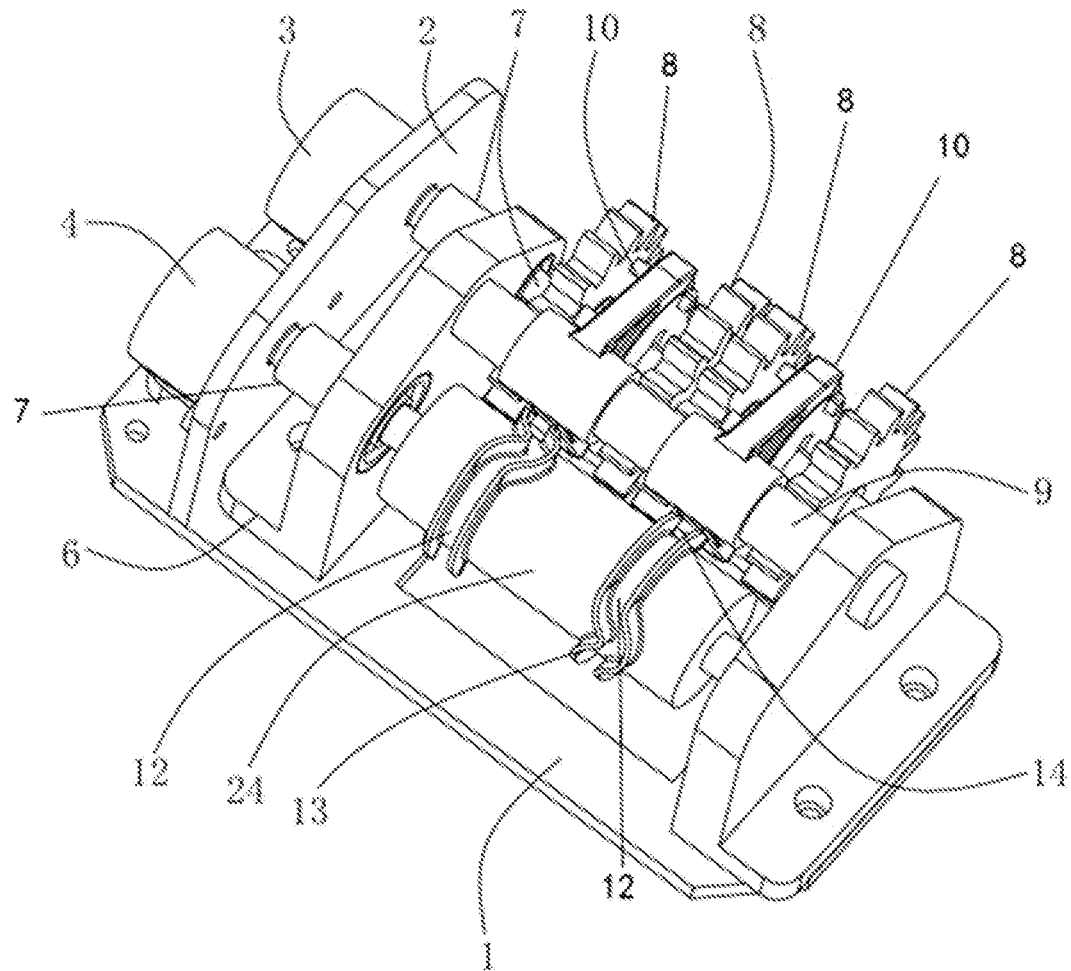
FIG. 2 is a rear view of the whole apparatus shown in FIG. 1.
Figure 3:
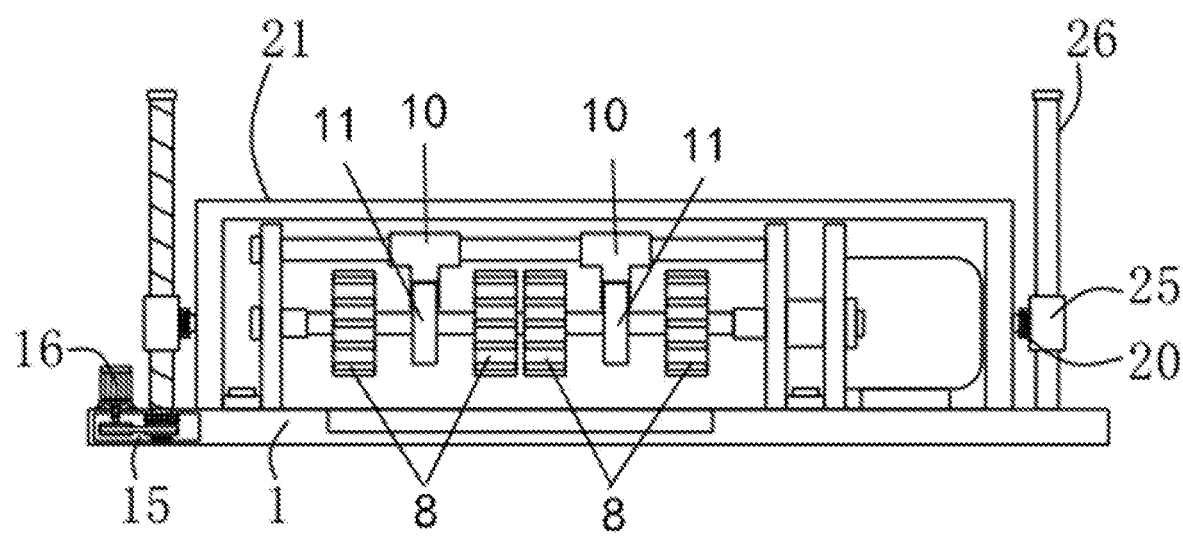
FIG. 3 is a schematic structural diagram of Second Embodiment of the integrated power distribution apparatus for a cooking robot provided by the disclosure.
Figure 4:
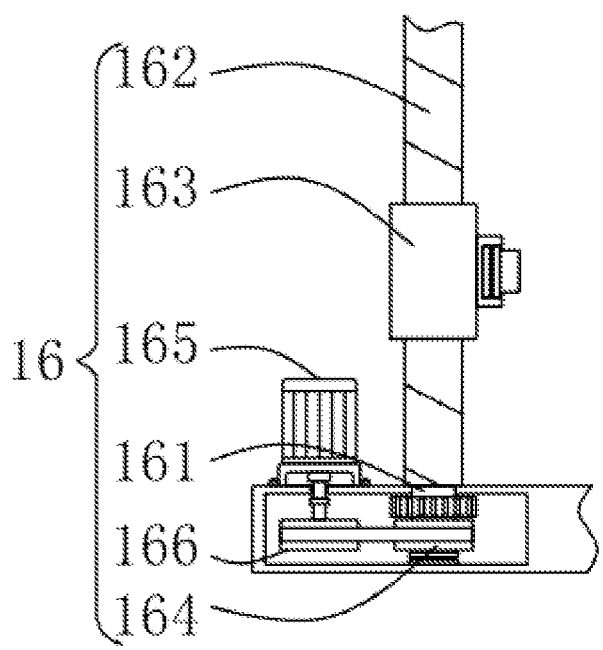
FIG. 4 is a schematic structural diagram of a driving apparatus shown in FIG. 3.
Figure 5:
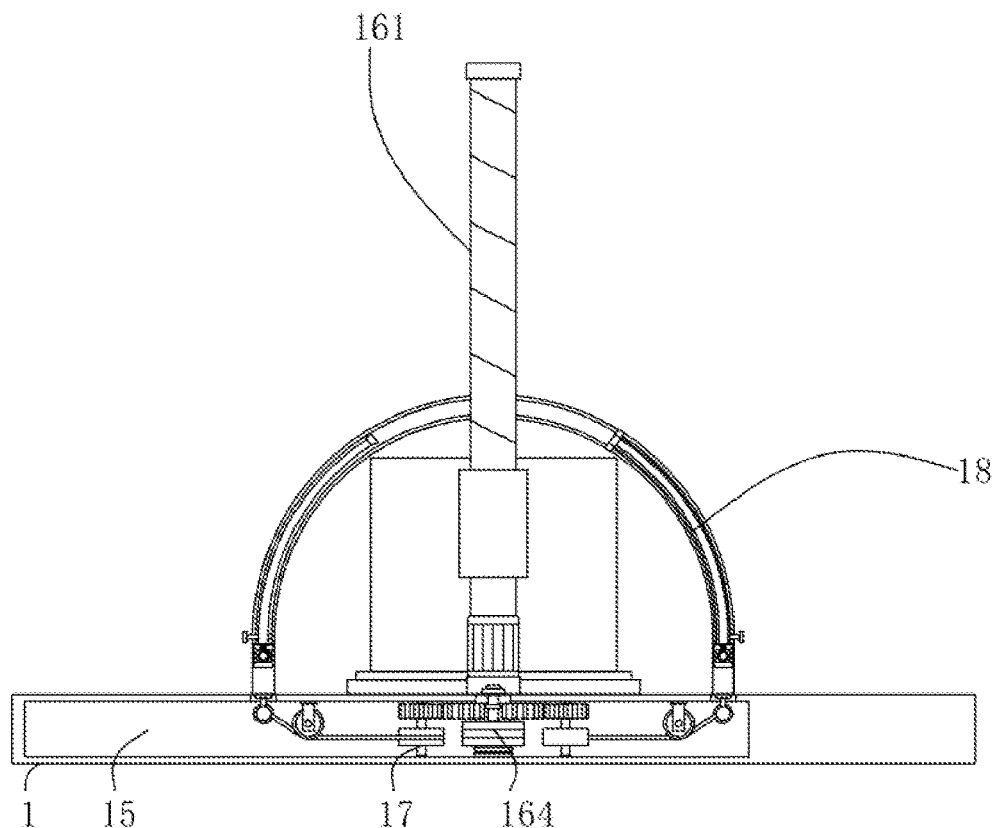
FIG. 5 is a left view of a protective cover shown in FIG. 3.
Figure 6:
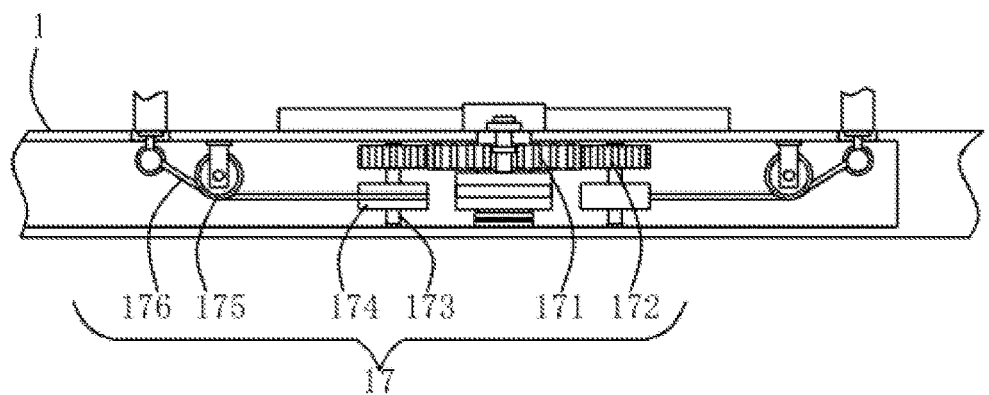
FIG. 6 is a schematic structural diagram of a retracting apparatus shown in FIG. 3.
Figure 7:
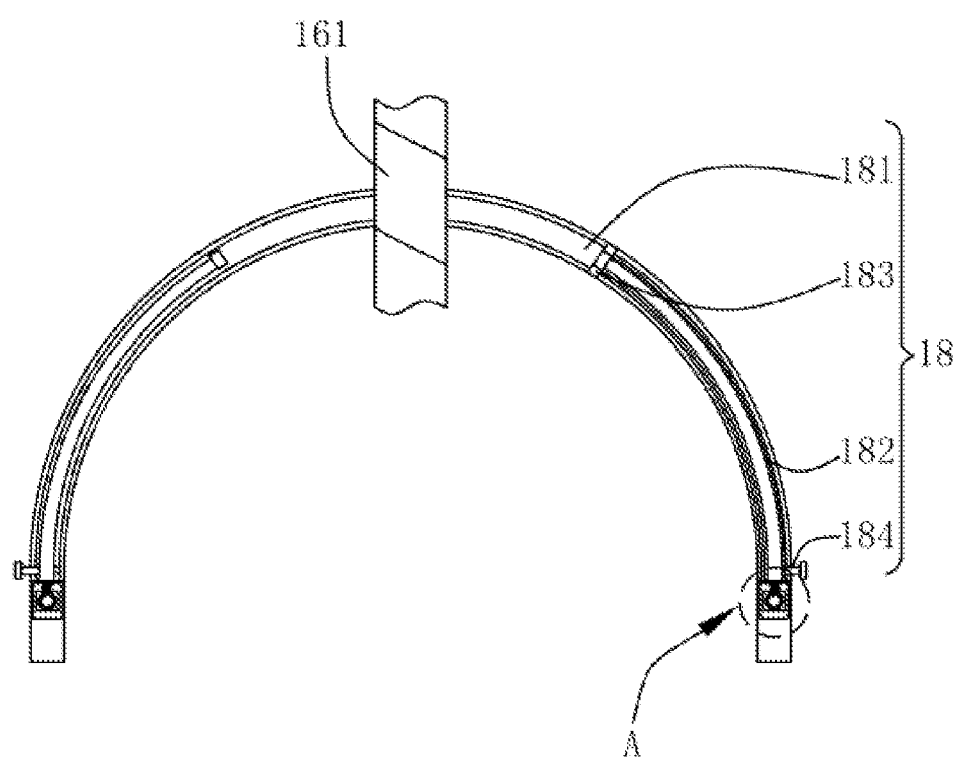
FIG. 7 is a schematic structural diagram of a movable assembly shown in FIG. 3.
Figure 8:
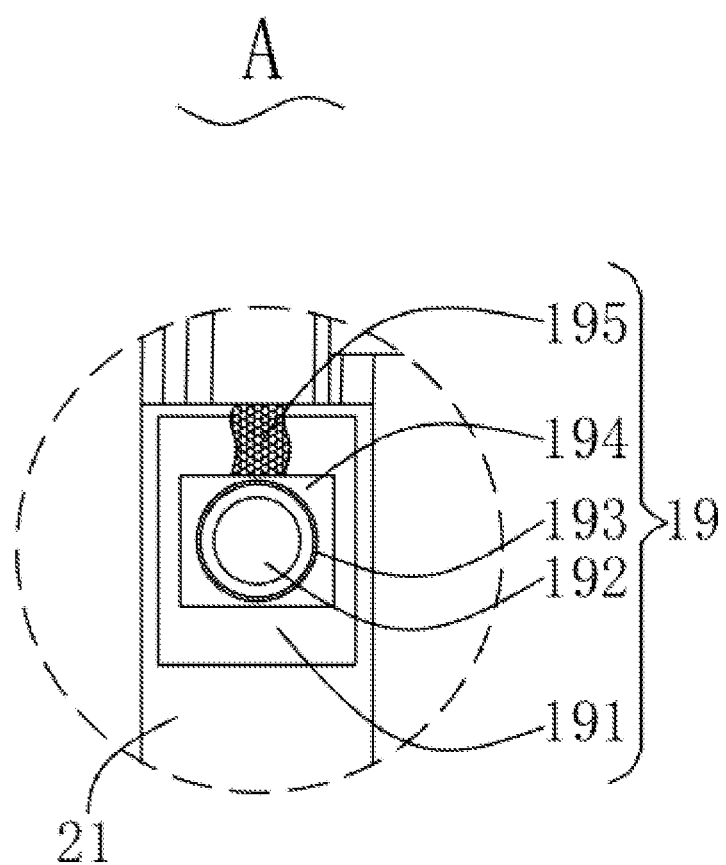
FIG. 8 is an enlarged view of a part A shown in FIG. 7.

With reference to FIG. 1 and FIG. 2, FIG. 1 is a schematic structural diagram of First Embodiment of an integrated power distribution apparatus for a cooking robot provided by the disclosure; and FIG. 2 is a rear view of the whole apparatus shown in FIG. 1. An integrated power distribution apparatus for a cooking robot comprises:
 a bottom plate 1;
 a motor fixing base 2, wherein the motor fixing base 2 is fixedly mounted on one side of a surface of the bottom plate 1;
 a power motor 3, wherein the power motor 3 is fixedly mounted on one side of the motor fixing base 2 and located above the bottom plate 1;
 a control motor 4, wherein the control motor 4 is fixedly mounted on a surface of the motor fixing base 2 and located on one side of the motor fixing base 4 on which the power motor 3 is located;
 a shaft coupler 5, wherein two shaft couplers 5 are provided, and the two shaft couplers 5 are respectively arranged on one sides of the power motor 3 and the control motor 4 and located on the surface of the motor fixing base 2;
 wherein, the power motor 3 and the control motor 4 are both connected with one side of the surface of the motor fixing base 2 through a bolt,
 the power motor 3 is a direct-current brushless motor, and may also be an alternating-current motor or a general motor, and the control motor is a stepping motor, and may also be a servo motor;
 a fixed support 6, wherein the fixed support 6 is fixedly mounted on the surface of the bottom plate 1 and located on one sides of the two shaft couplers 5;
 a rotation output shaft 7, wherein two rotation output shafts 7 are provided, and the two rotation output shafts 7 are respectively arranged on a surface of the fixed support 6 and located on one side of the fixed support 6 opposite to the two shaft couplers 5;

a power output gear 8, wherein four power output gears 8 are provided, and the four power output gears 8 are sequentially arranged from left to right on one side of the rotation output shaft 7;

wherein, the power output gear 8 is a spur gear, and may be a bevel gear, a worm, a pulley, a chain wheel or other transmission parts;

a placement base 22, wherein the placement base 22 is fixedly mounted on the surface of the bottom plate 1 and located on one side of the power output gears 8; and a bearing 23, wherein two bearings 23 are provided, and the two bearings 23 are respectively arranged on two sides of an interior of the placement base 22.

The rotation output shaft 7 on one side of the power output gears 8 is rotatably connected with the bearing 23.

One side of the fixed support 6 is fixedly connected with a fixed shaft 9, a synchronous wheel fork 10 is sleeved on both sides of a surface of the fixed shaft 9, and power synchronous wheels 11 are arranged inside the two synchronous wheel forks 10 and located on two sides of the power output gears 8.

One end of the rotation output shaft 7 is fixedly connected with a roller selector 24, both sides of a surface of the roller selector 24 are provided with a groove 12, the two grooves 12 are internally provided with an offset point 13, and cylindrical blocks 14 are arranged in the two grooves 12 and located on one side of the roller selector 24.

Each power output gear 8 is in transmission connection with different end equipment respectively, and different transmission reduction ratios are applied according to end application requirements. Therefore, the same power motor 3 can used for different kitchen electrical appliances.

Operating principle of the integrated power distribution apparatus for a cooking robot provided by the disclosure is as follows.

In a normal state during working, the cylindrical block 14 of the synchronous wheel fork 10 is located in a non-offset position in the groove 12, the power motor 3 rotates to drive the power synchronous wheel 11 to rotate, while the power output gear 8 remains stationary, and the control motor 4 rotates the roller selector 24 to a corresponding position, so that the cylindrical block 14 on the synchronous wheel fork 10 moves to an offset position of the groove 12 of the roller selector 24. At the moment, the offset point 13 of the groove 12 will push the synchronous wheel fork 10 to slide on the fixed shaft by an offset distance, and the synchronous wheel fork 10 will push the power synchronous wheel 11 to slide on the power output shaft by an offset distance. At the moment, synchronous teeth on one side of the power synchronous wheel 11 will be coupled with synchronous teeth on a side surface of the power output gear 8, so that when the power motor 3 rotates, the power synchronous wheel 11 will drive the corresponding power output gear 8 to rotate, and the remaining gears will remain stationary. The control motor 4 rotates the roller selector 24 to different offset positions of the grooves 12, so that the power motor 3 is coupled with different power output gears 8.

Compared with the related art, the integrated power distribution apparatus for a cooking robot provided by the disclosure has the following beneficial effects.

According to the integrated power distribution apparatus for a cooking robot, one power motor 3, one control motor 4 and one set of mechanical transmission structure are used, forming one integrated power distribution apparatus. The integrated power distribution apparatus can be applied to the cooking robot, which has a reliable structure and a smaller occupied space, and the cost of kitchen equipment can be reduced due to reduction in amount of the equipment.

Second Embodiment

With reference to FIG. 3, FIG. 4, FIG. 5, FIG. 6, FIG. 7 and FIG. 8, based on the integrated power distribution apparatus for a cooking robot provided in First Embodiment of the present application, Second Embodiment of the present application provides another integrated power distribution apparatus for a cooking robot. Second Embodiment is only a preferred mode of First Embodiment, and the implementation of Second Embodiment will not affect the independent implementation of First Embodiment.

Specifically, differences of the integrated power distribution apparatus for a cooking robot provided by Second Embodiment of the present application lie in that, according to the integrated power distribution apparatus for a cooking robot, the bottom plate 1 is provided with an cavity 15 at one side of the bottom plate 1, in which a driving apparatus 16 is arranged, the driving apparatus 16 comprises a rotating rod 161, a top end of the rotating rod 161 is fixedly connected with a threaded rod 162, a surface of the threaded rod 162 is threadedly connected with a threaded block 163, a sliding rod 26 is fixedly connected on a surface of the bottom plate 1 and located on one side opposite to the threaded rod 162, a sliding block 25 is sleeved around the sliding rod 26, one sides of the threaded block 163 and the sliding block 25 opposite to each other are both provided with a rotating base 20, and a protective cover 21 is arranged between the two rotating bases 20.

A bottom portion of the rotating rod 161 is rotatably connected with a bottom portion of an inner wall of the cavity 15 through a rotating shaft, and top ends of the threaded rod 162 and the sliding rod 26 are both fixedly connected with a baffle block.

A first pulley 164 is sleeved around the rotating rod 161, a motor 165 is fixedly mounted on the surface of the bottom plate 1 and located on one side of the threaded rod 162, one end of an output shaft of the motor 165 is fixedly connected with a second pulley 166 through a shaft coupler, and the first pulley 164 and the second pulley 166 are in transmission connection through a belt.

The motor 165 is threadedly connected with the surface of the bottom plate 1 through a threaded bolt, and the motor 165 is a servo motor.

Retracting apparatuses 17 are arranged in the cavity 15 and located on two sides of the rotating rod 161, the retracting apparatus 17 comprises a first gear 171, both sides of the first gear 171 are engaged with a second gear 172, bottom portions of the two second gears 172 are both fixedly connected with a rotary rod 173, and bottom portions of the two rotary rods 173 are rotatably connected with two sides of a bottom portion of the inner wall of the cavity 15 through a rotating shaft.

The first gear 171 is sleeved around the rotating rod 161, and top portions of the two second gears 172 are both rotatably connected with two sides of a top portion of the inner wall of the cavity through a rotating shaft.

Rotating wheels 174 are sleeved around the two rotary rods 173, two sides of the top portion of the inner wall of the cavity 15 are both fixedly provided with a fixed pulley 175, and both sides of a bottom portion of the protective cover 21 are fixedly connected with the two rotating wheels 174 through a connecting rope 176.

One ends of the two connecting ropes 176 are fixedly connected with a bottom portion of the protective cover 21 respectively, the other ends of the two connecting ropes penetrate through one sides of the fixed pulleys 175 respectively and extend to the other sides of the two fixed pulleys 175, and are fixedly connected with the two rotating wheels 174.

A movable assembly 18 is provided in the protective cover 21, the movable assembly 18 comprises an arc-shaped cavity 181, an arc-shaped movable plate 182 is provided in the arc-shaped cavity 181, one side of the arc-shaped movable plate 182 is fixedly connected with a limit plate 183, and a grip 184 is fixedly mounted on one side of a surface of the arc-shaped movable plate 182.

The arc-shaped movable plate 182 is arranged on a right side of the arc-shaped cavity 181, and a left side of the arc-shaped cavity 181 is also provided with an arc-shaped movable plate 182. When an arc groove adapted to the arc-shaped movable plate 182 on the left side is formed in the arc-shaped movable plate 182 on the right side, one side of a surface of the arc-shaped movable plate 182 on the left side is also fixedly mounted with a grip 184, and a bottom portion of the arc-shaped movable plate 182 on the left side is also fixedly connected with a baffle fabric 195.

A baffle assembly 19 is arranged in the protective cover 21 and located below the arc-shaped cavity 181, the baffle assembly 19 comprises a placement cavity 191, and a revolving rod 192 is rotatably connected between two sides of an inner wall of the placement cavity 191 through a rotating shaft.

One side of a surface of the revolving rod 192 is provided with a coil spring 193, both sides of the surface of the revolving rod 192 are fixedly connected with a baffle plate 194, and the surface of the revolving rod 192 is provided with the baffle fabric 195.

The baffle fabric 195 is made of a mesh or transparent material.

Operating principle of the integrated power distribution apparatus for a cooking robot provided by the disclosure is as follows.

The operator starts the motor 165 on one side of the surface of the bottom plate 1 to rotate first when the apparatus needs to be maintained and overhauled, the second pulley 166 is driven to rotate when the first motor 165 rotates, the first pulley 164 is driven to rotate through the belt when the second pulley 166 rotates, the rotating rod 161 in the cavity 15 is driven to rotate when the first pulley 164 rotates, the threaded rod 162 on the surface of the bottom plate 1 is driven to rotate when the rotating rod 161 rotates, the threaded block 163 on the surface of the threaded rod is driven to move upwardly when the threaded rod 162 rotates, the protective cover 21 is driven to move upwardly through the rotating base 20 when the threaded block 163 moves upwardly, and the sliding block 25 is driven to move upwardly on the surface of the sliding rod 26 through the rotating base 20 when the protective cover 21 moves upwardly.

The first gear 171 is driven to rotate when the rotating rod 161 rotates, the second gears 172 on both sides of the first gear are driven to rotate when the first gear 171 rotates, the rotary rods 173 at bottom portions of the two second gears 172 are driven to rotate when the two second gears 172 rotate, the rotating wheels 174 on surfaces of the two rotary rods are driven to rotate when the two rotary rods 173 rotate, and the connecting ropes 176 are driven to retract respectively when the two rotating wheels 174 rotate, so as to move the protective cover 21.

The operator pushes the arc-shaped movable plate 182 to move in the arc-shaped cavity 181 through the grip 184 when the apparatus needs to be inspected, the baffle fabric 195 is driven to move in the arc-shaped cavity 181 when the arc-shaped movable plate 182 moves in the arc-shaped cavity 181, the revolving rod 192 is driven to rotate when the baffle plate 194 is pulled, the coil spring 193 at one end is compressed when the revolving rod 192 rotates, so that the coil spring 193 is in a compressed state, and the apparatus can be inspected when the arc-shaped movable plate 182 moves to one side of the protective cover 21.

Compared with the related art, the integrated power distribution apparatus for a cooking robot provided by the disclosure has the following beneficial effects.

According to the integrated power distribution apparatus for a cooking robot provided by the disclosure, the driving apparatus 16 and the protective cover 21 are cooperated to facilitate the protection of the apparatus, which can prevent an operator from suffering a physical injury in the case of improper operation, and can reduce a probability of machining accidents, the sliding rod 26 and the sliding block 25 are cooperated to limit the protective cover 21, which can prevent the protective cover 21 from rotating during working of the threaded block 163, the retracting apparatus 17 is used to conveniently drive the protective cover 21 to move in cooperation with the driving apparatus 16, which can facilitate the maintenance by the operator, and the movable assembly 18 and the baffle assembly 19 are cooperated to facilitate the observation of the apparatus by the operator, and facilitate the protection of the operator.

The above are only the embodiments of the disclosure, and are not intended to limit the patent scope of the disclosure. Any equivalent structures or equivalent process transformations made by utilizing the contents of the specification and the drawings of the disclosure, or directly or indirectly applied in other related technical fields are equally included in the scope of protection of the patent of the disclosure.

What is claimed is:

1. An integrated power distribution apparatus for a cooking robot, comprising:
    a bottom plate;
    a motor fixing base, wherein the motor fixing base is fixedly mounted on one side of a surface of the bottom plate;
    a power motor, wherein the power motor is fixedly mounted on one side of the motor fixing base and located above the bottom plate;
    a control motor, wherein the control motor is fixedly mounted on a surface of the motor fixing base and located on the one side of the motor fixing base on which the power motor is located;
    a shaft coupler, wherein two shaft couplers are provided, and the two shaft couplers are respectively arranged on one side of the power motor and the control motor and located on the surface of the motor fixing base;
    a fixed support, wherein the fixed support is fixedly mounted on the surface of the bottom plate and located on one side of the two shaft couplers;
    a rotation output shaft, wherein two rotation output shafts are provided, and the two rotation output shafts are respectively arranged on a surface of the fixed support and located on one side of the fixed support opposite to the two shaft couplers;
    a power output gear, wherein four power output gears are provided, and the four power output gears are sequentially arranged from left to right on one side of the rotation output shaft;

a placement base, wherein the placement base is fixedly mounted on the surface of the bottom plate and located on one side of the power output gears; and a bearing, wherein two bearings are provided, and the two bearings are respectively arranged on two sides of an interior of the placement base; and the one side of the fixed support is fixedly connected with a fixed shaft, a synchronous wheel fork is sleeved on both sides of a surface of the fixed shaft, and power synchronous wheels are arranged inside the two synchronous wheel forks and located on two sides of the power output gears; and one end of the rotation output shaft associated with the power motor is fixedly connected with a roller selector, both sides of a surface of the roller selector are provided with a groove, the two grooves are internally provided with an offset point, and cylindrical blocks are arranged in the two grooves and located on one side of the roller selector;

when the power motor rotates, the power motor drives the power synchronous wheels to rotate, while the power output gears remain stationary;

when one of the synchronous wheel forks pushes one of the power synchronous wheels to couple with one of the power output gears, the one of the power synchronous wheels drives the corresponding one of the power output gears to rotate and the remaining gears remain stationary.

2. The integrated power distribution apparatus for the cooking robot according to claim 1, wherein the bottom plate is provided with a cavity at one side of the bottom plate, in which a driving apparatus is arranged, the driving apparatus comprises a rotating rod, a top end of the rotating rod is fixedly connected with a threaded rod, a surface of the threaded rod is threadedly connected with a threaded block, a sliding rod is fixedly connected on a surface of the bottom plate and located on one side opposite to the threaded rod, a sliding block is sleeved around the sliding rod, one sides of the threaded block and the sliding block opposite to each other are both provided with a rotating base, and a protective cover is arranged between the two rotating bases.

3. The integrated power distribution apparatus for the cooking robot according to claim 2, wherein a first pulley is sleeved around the rotating rod, a motor is fixedly mounted on the surface of the bottom plate and located on one side of the threaded rod, one end of an output shaft of the motor is fixedly connected with a second pulley through a shaft coupler, and the first pulley and the second pulley are in transmission connection through a belt.

4. The integrated power distribution apparatus for the cooking robot according to claim 3, wherein retracting apparatuses are arranged in the cavity and located on two sides of the rotating rod, the retracting apparatus comprising a first gear, both sides of the first gear are engaged with a second gear, bottom portions of the two second gears are both fixedly connected with a rotary rod, and bottom portions of the two rotary rods are rotatably connected with two sides of a bottom portion of an inner wall of the cavity through a rotating shaft.

5. The integrated power distribution apparatus for the cooking robot according to claim 4, wherein rotating wheels are sleeved around the two rotary rods, both sides of a top portion of the inner wall of the cavity are fixedly provided with a fixed pulley, and both sides of a bottom portion of the protective cover are fixedly connected with the two rotating wheels through a connecting rope.

6. The integrated power distribution apparatus for the cooking robot according to claim 5, wherein a movable assembly is provided in the protective cover, the movable assembly comprises an arc-shaped cavity, an arc-shaped movable plate is provided in the arc-shaped cavity, one side of the arc-shaped movable plate is fixedly connected with a limit plate, and a grip is fixedly mounted on one side of a surface of the arc-shaped movable plate.

7. The integrated power distribution apparatus for the cooking robot according to claim 6, wherein a baffle assembly is arranged in the protective cover and located below the arc-shaped cavity, the baffle assembly comprises a placement cavity, and a revolving rod is rotatably connected between two sides of an inner wall of the placement cavity through a rotating shaft.

8. The integrated power distribution apparatus for the cooking robot according to claim 7, wherein one side of a surface of the revolving rod is provided with a coil spring, both sides of the surface of the revolving rod are fixedly connected with the baffle plate, and the surface of the revolving rod is provided with a baffle fabric.

* * * * *